United States Patent
Cooke et al.

(10) Patent No.: US 11,378,806 B1
(45) Date of Patent: Jul. 5, 2022

(54) MULTI-ELEMENT ELECTROMECHANICAL ACTUATION MECHANISM FOR ASYMMETRIC OPTICAL APPLICATIONS

(71) Applicant: Facebook Technologies, LLC, Menlo Park, CA (US)

(72) Inventors: John Cooke, Bothell, WA (US); Andrew John Ouderkirk, Kirkland, WA (US); Robin Sharma, Redmond, WA (US); Katherine Marie Smyth, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 521 days.

(21) Appl. No.: 16/213,722

(22) Filed: Dec. 7, 2018

(51) Int. Cl.
*G02B 27/01* (2006.01)
*G02B 3/14* (2006.01)
(Continued)

(52) U.S. Cl.
CPC .......... *G02B 27/0176* (2013.01); *G02B 3/14* (2013.01); *G02B 26/004* (2013.01);
(Continued)

(58) Field of Classification Search
CPC .... G02B 27/0176; G02B 26/004; G02B 3/14; G02B 2027/0127; G02B 2027/0138;
(Continued)

(56) References Cited

U.S. PATENT DOCUMENTS

| 5,371,629 A | * | 12/1994 | Kurtin | ...................... G02B 3/14 351/158 |
| 2010/0208357 A1 | * | 8/2010 | Batchko | ................... G02B 5/20 359/666 |

(Continued)

FOREIGN PATENT DOCUMENTS

| CN | 205750114 | * | 11/2016 | ............. G02B 27/01 |
| CN | 107807447 | * | 3/2018 | ......... G02B 27/0176 |
| JP | H052104 | * | 1/1993 | ............... G02B 3/14 |

OTHER PUBLICATIONS

G. Heiting "Adjustable Glasses: The Future Of Multifocal Lenses?", retrieved from https://www.allaboutvision.com/lenses/variable-focus.htm and printed on Jan. 8, 2019, 1 page.
(Continued)

*Primary Examiner* — George G. King
(74) *Attorney, Agent, or Firm* — Weaver Austin Villeneuve & Sampson LLP

(57) ABSTRACT

Techniques for adjusting an optical element using an actuator assembly. The optical element is adjusted by translating the optical element along a linear axis of motion or by applying force upon a surface of the optical element. The optical element can be a liquid lens that is shaped by the application of force upon a surface of the lens. The actuator assembly includes a plurality of lead screws and a mechanical linkage that intercouples the lead screws and that is configured to simultaneously rotate the plurality of lead screws. The actuator assembly further includes a displacement element configured to act upon the optical element, through translational motion of the displacement element in response to rotation of the lead screws. Multiple optical elements can be adjusted simultaneously using respective displacement elements coupled to the lead screws.

20 Claims, 11 Drawing Sheets

(51) Int. Cl.
　　　*G02B 26/00*　　　(2006.01)
　　　*G06F 3/01*　　　(2006.01)
　　　*H04N 13/344*　　　(2018.01)
(52) U.S. Cl.
　　　CPC .............. *G02B 2027/0127* (2013.01); *G02B 2027/0138* (2013.01); *G02B 2027/0159* (2013.01); *G06F 3/013* (2013.01); *H04N 13/344* (2018.05)

(58) Field of Classification Search
　　　CPC ........ G02B 2027/0159; G02B 27/0172; H04N 13/344; G06F 3/013
　　　USPC ......................................................... 351/107
　　　See application file for complete search history.

(56) References Cited

U.S. PATENT DOCUMENTS

| | | | |
|---|---|---|---|
| 2013/0050432 A1* | 2/2013 | Perez | G06F 3/017 |
| | | | 348/47 |
| 2015/0309334 A1* | 10/2015 | Stevens | G02B 3/14 |
| | | | 351/154 |
| 2016/0004102 A1* | 1/2016 | Nisper | G02B 27/0172 |
| | | | 351/158 |
| 2020/0310137 A1* | 10/2020 | Lan | G02B 27/0149 |

OTHER PUBLICATIONS

Barbero et al., "Adjustable-focus lenses based on the Alvarez principle," Journal of Optics, IOP Publishing Ltd, J. Opt. 13, 2011, 11 pages.

B. Yirka, "New eyeglasses allow you to adjust prescription yourself," retrieved from https://phys.org/news/2012-05-eyeglasses-adjust-prescription.html and printed on Jan. 8, 2019, 3 pages.

* cited by examiner

MULTI-ELEMENT ELECTROMECHANICAL ACTUATION MECHANISM FOR ASYMMETRIC OPTICAL APPLICATIONS

BACKGROUND

Some systems have the ability to move and reposition optical elements. For example, uniaxial lens translation mechanisms exist for various consumer products, scientific instruments, medical devices, and sensing systems. These mechanisms are generally employed in applications such as sensor imaging for zoom and autofocus functions, as well as in laser beam shaping and divergence control. Cameras, lasers, and sensor optical systems often use symmetrical cylindrically-profiled lens elements that are displaced using a single linear or rotary actuator to achieve a desired uniaxial motion. Another adjustment mechanism employs a "tube within a tube" design comprising a motor powered rotating collar having helical slots that displace an internal lens holder. The lens holder is displaced using cam followers that engage with the helical slots.

A problem arises in the case when the optical element is asymmetric (e.g., a non-circular lens) and/or requires unequal, precise, displacements at several points around the perimeter of the optical element. In addition, low size, weight, power, and cost are desirable for the optical path components, especially when the optical element is used in a wearable device such as head-mounted display (HMD). HMDs are a wearable form of near-eye display (NED) and are sometimes used for displaying content in an augmented reality (AR) or virtual reality (VR) system. In the case of an HMD, a user typically views displayed content through an optical aperture, which should be kept free of obstructions that might block the view of the user.

SUMMARY

Described herein is an actuator assembly comprising an electromechanical actuation mechanism for adjusting an optical element in an optical system. In some embodiments, the optical element is adjusted by translating the optical element along a linear axis of motion, moving the entire optical element. In other embodiments, the optical element is adjusted by applying force upon a surface of the optical element. For example, in some embodiments, force is applied upon a flexible membrane of a liquid lens to shape the liquid lens. Embodiments described herein are suitable for use with symmetric (e.g., circular) optical elements, but are especially advantageous for applications that involve asymmetric optical elements, as well as applications that require non-uniform (unequal) force or displacement around a perimeter of an optical element being adjusted. In particular, some embodiments may be used for applying unequal force around the perimeter of a non-circular lens in order to achieve a desired optical effect (e.g., a desired optical power), and to synchronously apply non-uniform force/displacement to multiple lenses.

In certain embodiments, an actuator assembly includes a plurality of lead screws and a mechanical linkage that intercouples the plurality of leads screws. The mechanical linkage is configured to simultaneously rotate the plurality of lead screws. The actuator assembly further includes at least one displacement element. Each displacement element is configured to act upon a respective optical element to which the displacement element is coupled, through translational motion of the displacement element in response to rotation of the plurality of lead screws.

In certain embodiments, a system includes a head-mounted device and an actuator assembly. The head-mounted device includes an optical system with at least one optical element, wherein at the least one of the optical element includes a lens. The actuator assembly is housed within the head-mounted device and includes a plurality of lead screws and a mechanical linkage that intercouples the plurality of leads screws. The mechanical linkage is configured to simultaneously rotate the plurality of lead screws. The actuator assembly further includes at least one displacement element. Each displacement element is configured to act upon a respective optical element of the at least one optical element, through translational motion of the displacement element in response to rotation of the plurality of lead screws.

In certain embodiments, a method includes determining, by one or more processors of a computer system, a desired optical characteristic of an optical system including at least one optical element. The method further includes determining, by the one or more processors, a target position for at least one displacement element in an actuator assembly based on the desired optical characteristic. The actuator assembly includes an actuator configured to produce rotational output, a plurality of lead screws, and a mechanical linkage that intercouples the plurality of leads screws. The mechanical linkage is configured to simultaneously rotate the plurality of lead screws based on the rotational output produced by the actuator. The actuator assembly further includes the at least one displacement element. Each displacement element is configured to act upon a respective optical element of the at least one optical element, through translational motion of the displacement element in response to rotation of the plurality of lead screws. The method further includes causing, by the one or more processors, power to be applied to the actuator to move the at least one displacement element toward the target position.

BRIEF DESCRIPTION OF THE DRAWINGS

Illustrative embodiments are described with reference to the following figures.

Figure 1:
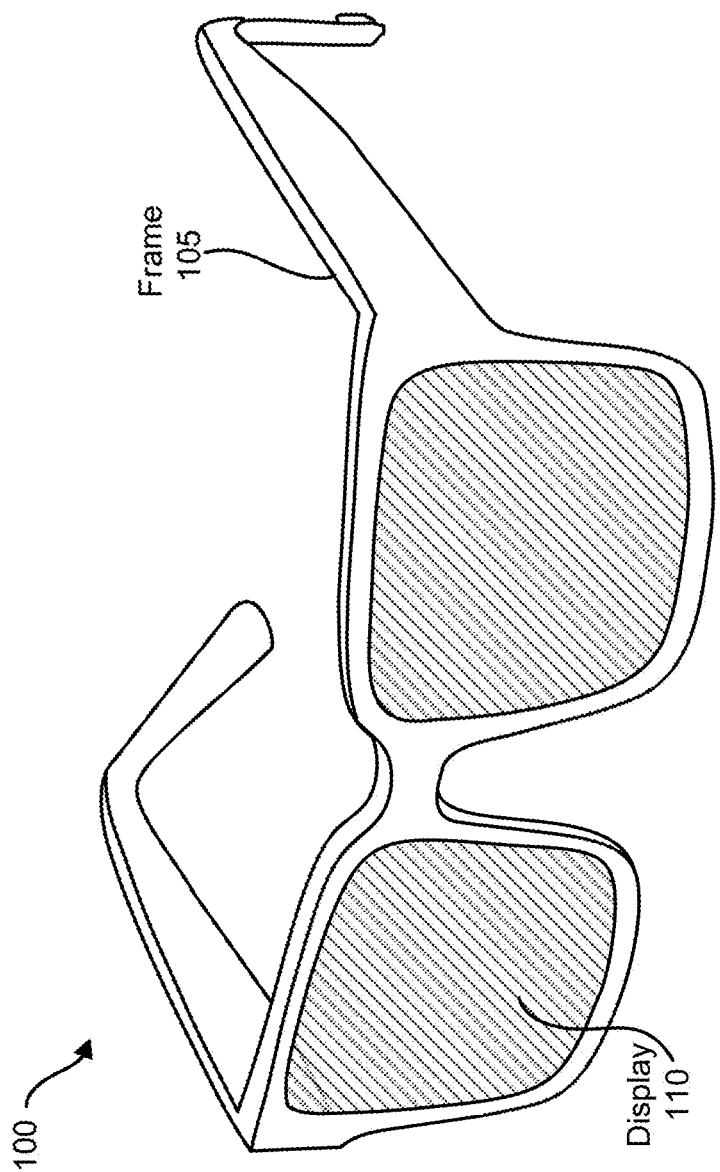
FIGS. 1 and 2 show examples of near-eye displays suitable for implementing one or more embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Example embodiments relate to an electromechanical actuation mechanism for adjusting an optical element in an optical system, for example, by displacing all or a portion of the optical element. In some embodiments, the optical element is adjusted by translating the optical element along a linear axis of motion, moving the entire optical element. In other embodiments, the optical element is adjusted by applying force upon a surface of the optical element. For example, in some embodiments, force is applied upon a flexible membrane of a liquid lens to shape the liquid lens. Embodiments described herein are suitable for use with symmetric (e.g., circular) optical elements, but are especially advantageous for applications that involve asymmetric optical elements, as well as applications that require non-uniform (unequal) force or displacement around a perimeter of an optical element being adjusted. In particular, some embodiments may be used for applying unequal force around the perimeter of a non-circular lens in order to achieve a desired optical effect (e.g., a desired optical power), and to synchronously apply non-uniform force/displacement to multiple lenses.

Example applications for an embodiment of the present disclosure include moving or distorting non-circular ophthalmic lenses for presbyopia correction or visual accommodation correction in a stand-alone HMD (e.g., an AR or VR device with an integrated controller) or in a system employing an HMD (e.g., an AR/VR device and a remote console controlling the AR/VR device). Accommodation refers to the change of optical power within the human eye as distance to the viewed object changes. Presbyopia is an age related condition characterized by lack of range of focus of the eye and inability to focus on close objects. An embodiment of a system according to the present disclosure could perform accommodation correction to provide a better viewing experience to the user by, for example, changing the relationship of the focal distance of a display image to a real-world image to correct for the natural focal shift of the user's eye when looking at near field objects, thereby keeping the display image in focus regardless of the eye's natural focal plane. The system could also correct for presbyopia by, for example, adaptively changing a focal length of a lens to provide the necessary corrective optical power to the user's eye at different focal distances (e.g., continuously adjusting the focal length to cover all near field focal distances).

Other potential applications include manipulation of non-circular lenses that are not used for viewing by a user, such as lenses in a sensor system. Embodiments can also be applied for asymmetric laser beam shaping or any other application where displacement or distortion of an optical element is desired.

In some embodiments, the optical elements include one or more liquid lenses. However, it is understood that the embodiments can be applied for displacement/distortion of other types of optical elements, such as solid lenses. Liquid lenses comprise a sealed cavity filled with fluid, e.g., a fluid having one or more desired properties such as a particular index of refraction, a particular viscosity, and/or a particular degree of light transmissivity. According to some embodiments, a liquid lens is shaped by expanding or compressing a flexible membrane of the lens. Expansion or compression of the membrane causes the fluid to be displaced to create an optical surface on one side of the lens. For example, optical power can be changed by applying pressure to the membrane to mechanically displace fluid from the perimeter of the lens toward the optical center of the lens, causing the membrane to bulge, thereby increasing refraction of light and thus the optical power of the lens.

Example embodiments relate to an electromechanical actuation mechanism that is operable to effect displacement of an optical element at multiple points around a perimeter of the optical element, using components located outside of an optical aperture. In this manner, the actuation mechanism can precisely control the displacement without impeding light transmission or image quality through the optical element, making the actuation mechanism especially suited for use with HMDs and other wearable devices where the optical aperture is a viewing aperture.

Example embodiments relate to an actuator assembly comprising an electromechanical actuation mechanism for synchronized displacement of a plurality of optical elements that are intercoupled to permit the optical elements to be driven by a single actuator. The ability to precisely control displacement of multiple optical elements using a single actuator facilitates flexible and rapid configuration of the optical system while minimizing size, weight, power consumption, and cost.

In some embodiments, an actuator assembly includes an actuator operable to produce rotational output (e.g., a motor), a plurality of lead screws including a first lead screw driven by the rotational output of the actuator, and a mechanical linkage (e.g., a belt or cable) configured to simultaneously rotate the plurality of lead screws (e.g., by distributing torque from the first lead screw to a remainder of the plurality of lead screws). The actuator assembly further includes at least one displacement element (e.g., a lens holder or displacement ring). Each displacement element is configured to act upon a respective optical element to which the displacement element is coupled, through translational motion of the displacement element in response to rotation of the plurality of lead screws.

In some embodiments, a system includes an HMD that houses an actuator assembly. The HMD includes an optical system with a plurality of optical elements, at least one of which is a lens that the actuator assembly acts upon.

In some embodiments, a method performed by one or more processors of a computer system includes determining, by the one or more processors, a desired optical characteristic of an optical system including at least one optical element. The method further includes determining (e.g., mapping or calculating), by the one or more processors, a target position for at least one displacement element in an actuator assembly based on the desired optical characteristic. The method further includes causing, by the one or more processors, power to be applied to an actuator of the actuator assembly to move the at least one displacement element toward the target position (e.g., using a belt or cable to simultaneously drive a plurality of lead screws).

In some embodiments, a displacement element is moved by different amounts (i.e., non-uniform displacement) at various points along the displacement element. In some embodiments, different displacement elements are non-uniformly displaced with respect to each other. The movements for a single displacement element or for multiple displacement elements can be synchronized using a mechanical linkage that causes a plurality of lead screws to simultaneously rotate. Depending on how the lead screws are threaded, different amounts and/or directions of displacement can be produced.

Embodiments of the present disclosure may include or be implemented in conjunction with an artificial reality system. Artificial reality is a form of reality that has been adjusted in some manner before presentation to a user, which may include, e.g., a VR, an AR, a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an NED connected to a host computer system, a standalone NED, a mobile device or computing system, or any other hardware platform capable of providing artificial reality content to one or more viewers.

FIG. 1 shows an NED 100 suitable for implementing one or more embodiments. The NED 100 presents media to a user. Examples of media presented by the NED 100 include one or more images, video, and/or audio. In some embodiments, audio is presented via an external device (e.g., speakers and/or headphones) that receives audio information from the NED 100, a console, or both, and presents audio output based on the audio information. The NED 100 can be configured to operate as a VR display. In some embodiments, the NED 100 is modified to operate as an AR display and/or an MR display.

The NED 100 includes a frame 105 and a display device 110. The frame 105 is shaped to enable the NED 100 to be worn in the manner of a pair of eyeglasses. Thus, the NED 100 is an example of an HMD. The frame 105 is coupled to one or more optical elements (e.g., lenses integral with the display device 110). The display device 110 is configured for the user to see content presented by NED 100. In some embodiments, the display device 110 comprises a waveguide display assembly for directing light from one or more images to an eye of the user.

The NED 100 may include one or more optical sensors (not shown) that capture optical data about the user and/or the external environment. For example, the optical sensors may include at least one pixel cell array comprising an plurality of pixel cells (e.g., a two-dimensional (2D) pixel cell array) configured to generate image data representing a particular field of view along a particular direction toward the user or toward the external environment.

In some embodiments, the NED 100 may include one or more active illuminators configured to project light toward the user and/or toward the external environment. Active illuminators are activated using electrical signals that cause the illuminators to project light. The projected light may form one or more light patterns, can be associated with different frequency spectrums (e.g., visible light, infrared (IR) light, near infrared (NIR) light, ultra-violet (UV) light, etc.), and can serve various purposes, including illuminating the user's face in connection with eye tracking or facial recognition and illuminating the external environment in connection with tracking of the location or head movement of the user.

Figure 2:
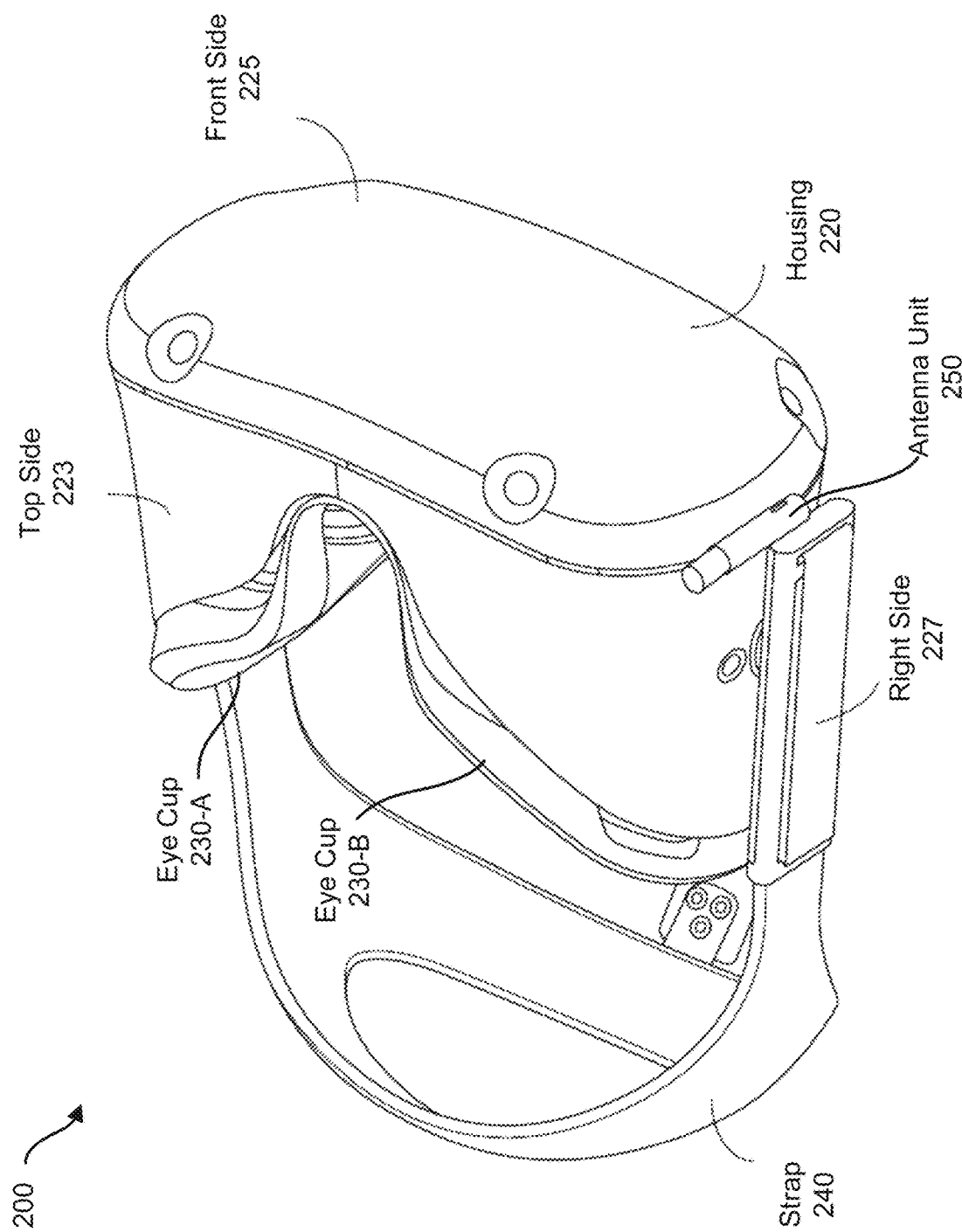

FIG. 2 shows an NED 200 suitable for implementing one or more embodiments. Like the NED 100, the NED 200 is an HMD designed to be worn by a user. The NED 200 includes a housing 220 and a display device (not shown) inside the housing. The display device may be positioned near a front side 225 of the NED 200. The housing 220 forms an enclosed viewing environment for the user and includes a pair of eye cups 230-A and 230-B that are attached to a top side 223 of the NED and surround the eyes of a user when the NED is being worn. The NED 200 further includes a strap 240 configured to secure the NED against a back of the user's head and various electronics (e.g., an antenna unit 250 for wireless communication with a remote computing device) located on a right side 227 of the NED 200. Both the NED 100 and the NED 200 may include optical elements that are integral with a display device or located along an optical path between the display device and an eye of the user.

Figure 3:
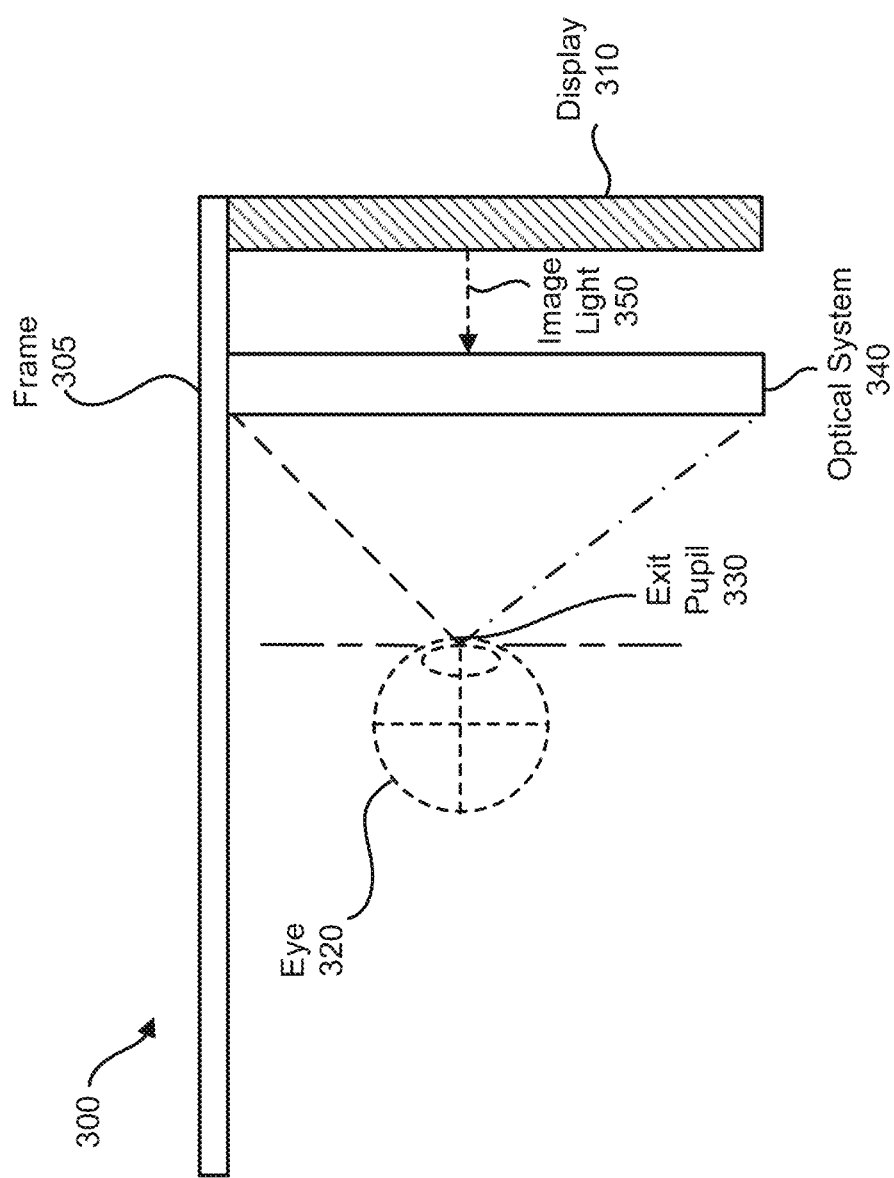
FIG. 3 shows a cross section of a near-eye display suitable for implementing one or more embodiments.

FIG. 3 shows a cross section of an NED 300 suitable for implementing one or more embodiments. The NED 300 may correspond to the NED 100 or the NED 200. The NED 300 includes a frame or housing 305, a display device 310, and an optical system 340. The display device 310 is configured to present image content to the user. The optical system 340 is configured to direct image light from the display device 310 to an eye 320 of the user. The optical system 340 may include a waveguide, lenses, and/or other optical elements that guide or adjust the image light 350. In some embodiments, additional optical elements are embedded within the display device. When placed into an operative position with respect to the user, e.g., when the user wears the NED 300, the NED 300 forms an exit pupil 330 at a location where the eye 320 is positioned in an eyebox region. For purposes of illustration, FIG. 3 shows the cross section associated with a single eye 320 and optical system 340, but a second optical system 340 can be used for a second eye of the user.

The optical system 340 is configured to direct the image light to the eye 320 through the exit pupil 330. The optical system 340 may include optical elements composed of one or more materials (e.g., plastic, glass, etc.) with one or more refractive indices. For example, the optical system 340 may include a waveguide composed of one or more materials with one or more refractive indices that effectively minimize the weight and widen a field of view (FOV) of the NED 300. The optical system may include other types of optical elements that adjust or guide the image light 350, e.g., to correct aberrations in the image light or magnify the image light. Example optical elements include an aperture stop, a Fresnel lens, a convex lens, a concave lens, a filter, a reflector, or any other suitable optical element that affects image light. In some embodiments, the optical system is part of or attached to the display device 310. In other embodiments, the optical system is separate from the display device 310 and located along an optical path between the eye 320 and the display device 310. The optical system may be driven by a controller of the NED 300 to, for example, adjust one or more optical characteristics of the optical system 340 using an electromechanical actuation mechanism in accordance with an embodiment described herein.

Figure 4:
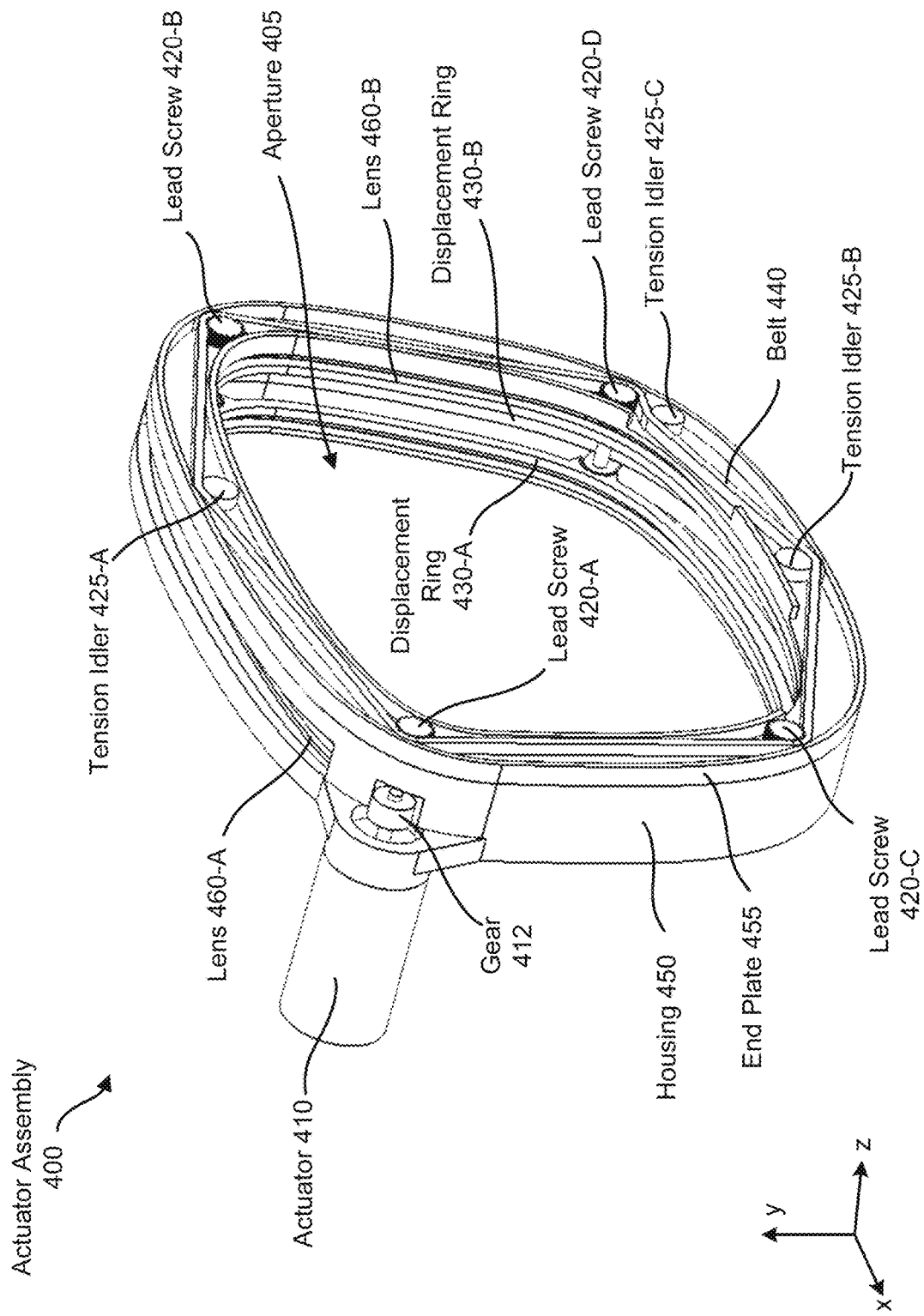
FIG. 4 is a perspective view of an actuator assembly, according to an embodiment.

FIG. 4 shows a perspective view of an actuator assembly 400 according to an embodiment. The actuator assembly 400 can be incorporated into a wearable device that includes an optical system, e.g., an HMD. The actuator assembly 400 includes an aperture 405, an actuator 410, lead screws 420-A to 420-D, tension idlers 425-A to 425-C, displacement rings 430-A and 430-B, a belt 440, a housing 450, an end plate 455, and lenses 460-A and 460-B. For simplicity, other types of optical elements have been omitted. However, it is understood that the actuator assembly 400 can include optical elements besides lenses. For example, the lenses 460 may be stacked together with a removable prescription lens or a Fresnel lens. Further, although described with respect to synchronized displacement of a pair of optical elements (the lenses 460-A and 460-B), the actuator assembly 400 can be adapted for displacement of any number of optical elements. For example, an additional displacement ring could be introduced for each optical element to be displaced. The embodiment of FIG. 4 can be used for translation of lenses or other optical elements by moving the displacement rings 430.

The aperture 405 forms a viewing window through which the user can see through the lenses 460-A and 460-B. The aperture 405 can include a layer of clear or light transmissive material that forms a protective layer for the lenses. In some embodiments, protective layers may be attached to both the housing 450 and the end plate 455 to seal the actuator assembly 400 against intrusion of dust, water, or other contaminants. Alternatively, the aperture 405 can be an opening defined by the housing 450 and the end plate 455.

The actuator 410 can be an electrically activated motor that generates rotational motion. Various types of motors are suitable for implementing the actuator 410, including stepper type, servo, direct current (DC), alternating current (AC), brushed, or brushless motors. In FIG. 4, the actuator 410 is mounted on a user facing side of the housing 450. Other locations for the actuator 410 are equally feasible including, for example, on the end plate 455 or along a side of the housing 450. The actuator 410 is coupled to the lead screw 420-A through a gear set including a gear 412 attached to the output end of the actuator 410 and a gear 414 (shown in FIG. 6) attached to the lead screw 420-A. The gear set can be implemented using spur gears (as shown in the figures) if the actuator 410 is mounted with its axis of rotation parallel to the longitudinal axes of the lead screws 420. Alternatively, the gear set can be implemented using bevel gears if the actuator 410 is mounted with the axis of rotation perpendicular to the longitudinal axes of the lead screws 420. The ratio of the gears can be set to achieve a desired travel speed for the displacement rings 430. For example, a speed reduction and torque amplification can be achieved using a smaller drive gear (e.g., the gear 412) than driven gear (e.g., the gear 414).

The lead screws 420 are located around the periphery of the optical elements, e.g., the lenses 460. The lead screws are placed outside of the aperture 405 in order not to obstruct the view of the user. The lead screws 420 operate to mechanically support the displacement rings 430 and to move the displacement rings 430 linearly in response to rotational output of the actuator 410. Each lead screw includes a threaded shaft in contact with the displacement rings 430 and a toothed head in contact with the belt 440. The shaft and head are shown more clearly in FIGS. 6 and 7. The threading of the shaft converts the rotary motion of the actuator 410 to linear motion (in FIG. 4, motion along the z direction). The lead screws 420 can be threaded in various ways. If uniform displacement is desired, the threading can be made uniform. In one embodiment, each lead screw has an individual, unique thread pitch so as to provide non-uniform displacement. For example, the distance between threads of the lead screw 420-A could be different from the distance between threads of the lead screw 420-B. For simplicity, the threading has been omitted from the figures, which depict the shaft sections of the lead screws as being smooth.

In some embodiments, one or more of the lead screws 420 are shaped as twin lead screws with a first threaded section at one end and a second threaded section at the opposite end, where the first threaded section is coupled to the displacement ring 430-A and the second threaded section is coupled to the displacement ring 430-B. The first threaded section and the second threaded section could be threaded in the same direction (e.g., both right-hand threaded) or in opposite directions (e.g., one section is right-hand threaded and the other section is left-hand threaded). Opposite threading of the sections would enable the lead screws to provide motion in opposite directions (e.g., so that the displacement rings 430-A and 430-B move away from each other). If the sections are threaded in the same direction, then the displacement rings 430-A and 430-B would move in the same direction.

The lead screws 420 can be supported on low friction sintered sleeve bearings or jeweled bearings (not shown). The bearings can be coupled to one or more ends of the lead screws to reduce friction and thus wearing as the lead screws are rotated. For example, bearings may be included at points where the lead screws meet the end plate 455.

The tension idlers 425 can be implemented as pulleys that rotate and prevent the belt 440 from contacting the end plate 455, thereby avoiding friction between the belt 440 and the end plate 455. The tension idlers 425 are positioned to provide sufficient tensioning of the belt 440 such that there is little or no slack that could otherwise cause the belt 440 to come into contact with the end plate 455.

The displacement rings 430 are relatively thin (in the z direction) and narrow in width (in the x direction). The thickness may be approximately of the same order of magnitude as the thickness of the lenses 460. The displacement rings 430 may operate as lens holders for the lenses. In this respect, the width of the displacement rings can be minimized so as not to obstruct the aperture 405, while being wide enough to securely hold the lenses.

In some embodiments, the travel of the displacement rings 430 may be limited using one or more sensors, for example using end-of-travel micro-switches positioned in the housing 450, such that the displacement rings 430 activate the micro-switches at a desired end of travel, thereby signaling a controller to shut off power supplied to the actuator 410. Alternatively, travel may be limited using a combination of an electronic shaft encoder (e.g., an absolute position type or relative counter type encoder) coupled with a micro-switch that is positioned on the actuator 410. The encoder could track the number of revolutions and/or angular position of an output shaft of the actuator 410 (e.g., the shaft to which the gear 412 is attached) to generate a signal indicating to the controller the actual position of the displacement rings 430, for example through a lookup table. Yet another way to limit travel would be to use a current sensor that senses a current of the actuator 410, together with a "bumper stop" element at the end of travel (e.g., a linear spring or elastomer that compresses with an increasing reaction force toward the end of travel). This resistance to motion would cause the actuator current to ramp up, allowing a current sensing controller to shut current off at a certain threshold current level corresponding to the end of travel position.

The lenses 460 are asymmetrically shaped, with lens 460-A being mounted on the displacement ring 430-A and lens 460-B being mounted on the displacement ring 430-B. The lenses 460 may be solid lenses. Alternatively, as explained below in connection with FIG. 9, lenses can be liquid lenses that include a flexible membrane. The lenses can be mounted to the displacement rings in various ways. For example, the lenses 460 may be mounted using an adhesive or other fixing agent. In some embodiments, the displacement rings 430 may include a grooved inner surface into which the lenses are friction fit in a similar manner to lenses in an eyeglass frame. Other mounting techniques are also possible.

Figure 7:
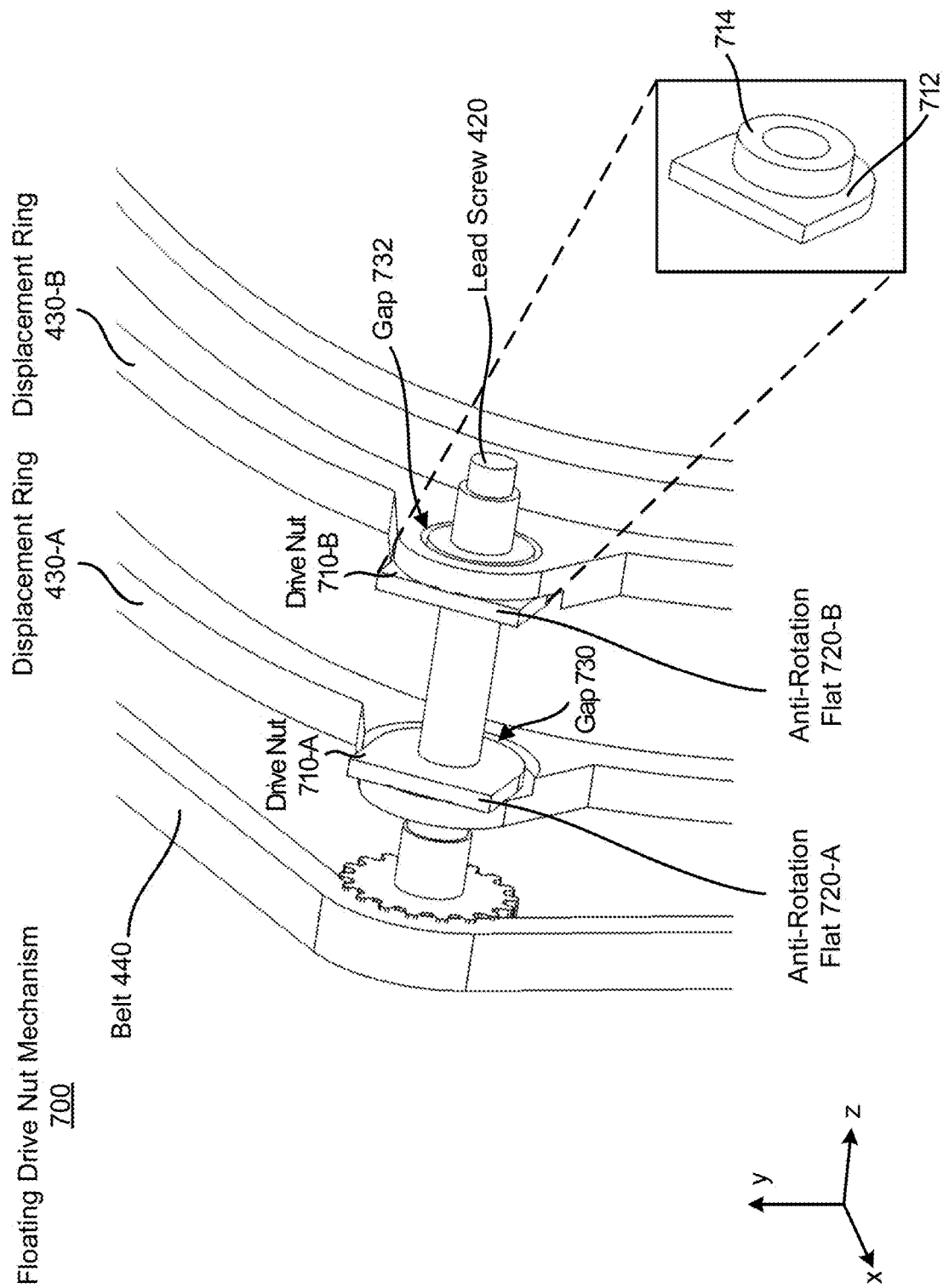
FIG. 7 is a perspective view of a floating drive nut mechanism that can be used to implement an actuator assembly, according to an embodiment.

The belt 440 operates as a mechanical linkage that converts rotational motion of the lead screw 420-A into rotational motion of the lead screws 420-B, 420-C, and 420-D. Like the lead screws 420, the belt 440 is located outside of the aperture 405. The actuator 410 applies torque via the gears 412 and 414 to the lead screw 420-A, causing the lead screw 420-A to displace the displacement ring 430-A (e.g., by pushing against the displacement ring using a drive nut that is threaded onto the lead screw, as shown in FIG. 7). The belt 440 distributes the torque applied to the lead screw 420-A to the other lead screws 420-B, 420-C, and 420-D. The belt 440 can be formed of a flexible material (e.g., a polymer or elastomer). The belt 440 can be spring loaded to increase belt tension and therefore increase the angle of wrap against the lead screws 420, thereby preventing slippage as the belt relaxes over the life of the actuator assembly 400. In some embodiments, the belt 440 may include teeth that engage the teeth of the lead screws 420. Other linkage mechanisms are also possible. For example, the belt 440 can be replaced with a beaded cable, a roller chain, or a gear train.

The use of a flexible belt for torque distribution helps prevent noise and vibration as compared with other torque distribution methods using more rigid components, due to the energy damping characteristics of the flexible material. The prevention of noise and vibration is desirable for an HMD as the proximity of the user's ear and direct wave propagation path from the device to the ear will make even slight vibrations and noise easily detectable to the user. In some embodiments, vibration is further reduced by using a soft motor mount between the housing 450 and the actuator 410 to damp any motor imbalance, acceleration or deceleration forces, or other sources of rotating mass-based vibration.

The housing 450 provides mechanical support for the actuator 410, the lead screws 420, the optical elements, and any other components which may reside within the housing 450. The housing can be formed of a rigid material such as a metal, a metal alloy, or a polymer metal (i.e., a polymer-metal composite). The housing 450 is mated to the end plate 455 and held in place against the end plate 455 by the lead screws 420-A to 420-D. In some embodiments, the housing 450 and the end plate 455 are attached to each other using fixed screws, adhesive, a snap fit or friction fit mechanism, or some other attachment mechanism. The housing 450 may include space for mounting additional optical elements such as fixed-location lenses. If the actuator assembly 400 is incorporated into an HMD or other wearable device, the housing 450 and the end plate 455 can be integrated into the wearable device such that the actuator assembly 400 is housed within the wearable device.

Figure 5:
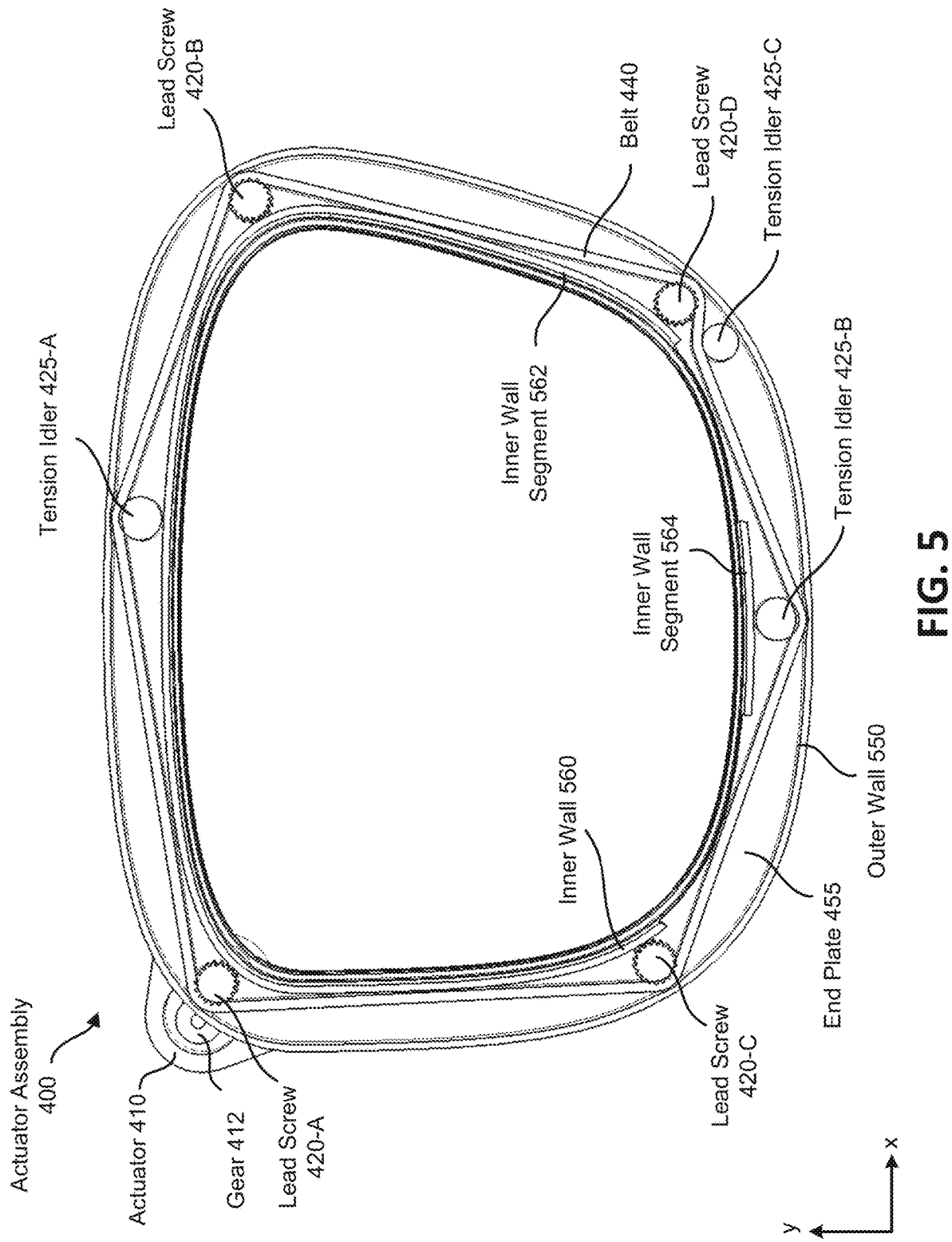
FIG. 5 is a front view of the actuator assembly of FIG. 4.

The end plate 455 provides thrust support for the lead screws 420 and, if bearings are included, may also provide support for the bearings. The end plate 455 includes a groove that receives the belt 440, the tension idlers 425, and the geared portions of the lead screws 420. FIG. 5 shows in further detail the arrangement of the lead screws 420, the belt 440, and the tension idlers 425 relative to the end plate 455.

FIG. 5 is a front view of the actuator assembly 400. As shown in the figure, the end plate 455 includes an outer wall 550 and an inner wall 560 that together form a groove in which the lead screws 420, the belt 440, and the tension idlers 425 are received. The tension idlers 425 apply enough tension to the belt 440 that the belt maintains continuous contact with the lead screws and does not come into contact with the walls 550 and 560 as the belt 440 moves along the lead screws. The walls 550 and 560 can be continuous or broken into segments. For example, FIG. 5 shows the inner wall 560 being formed of a first segment 562 that spans a majority of the perimeter of the inner wall and a shorter segment 564 that extends along the bottom of the inner wall, with spaces between the segments.

The actuator assembly 400 can include a floating drive nut mechanism (shown in FIG. 7) that allows for a small amount of transverse movement of the displacement rings 430. The transverse movement accommodates rotation of the displacement rings (e.g., rotation caused by non-uniform displacement at different points along the displacement rings) by preventing side loading of the lead screws 420. The floating drive nut mechanism also prevents binding of the mechanical linkage (e.g., the belt 440) that might otherwise occur as result of structural deflections of the housing 450.

Figure 6:
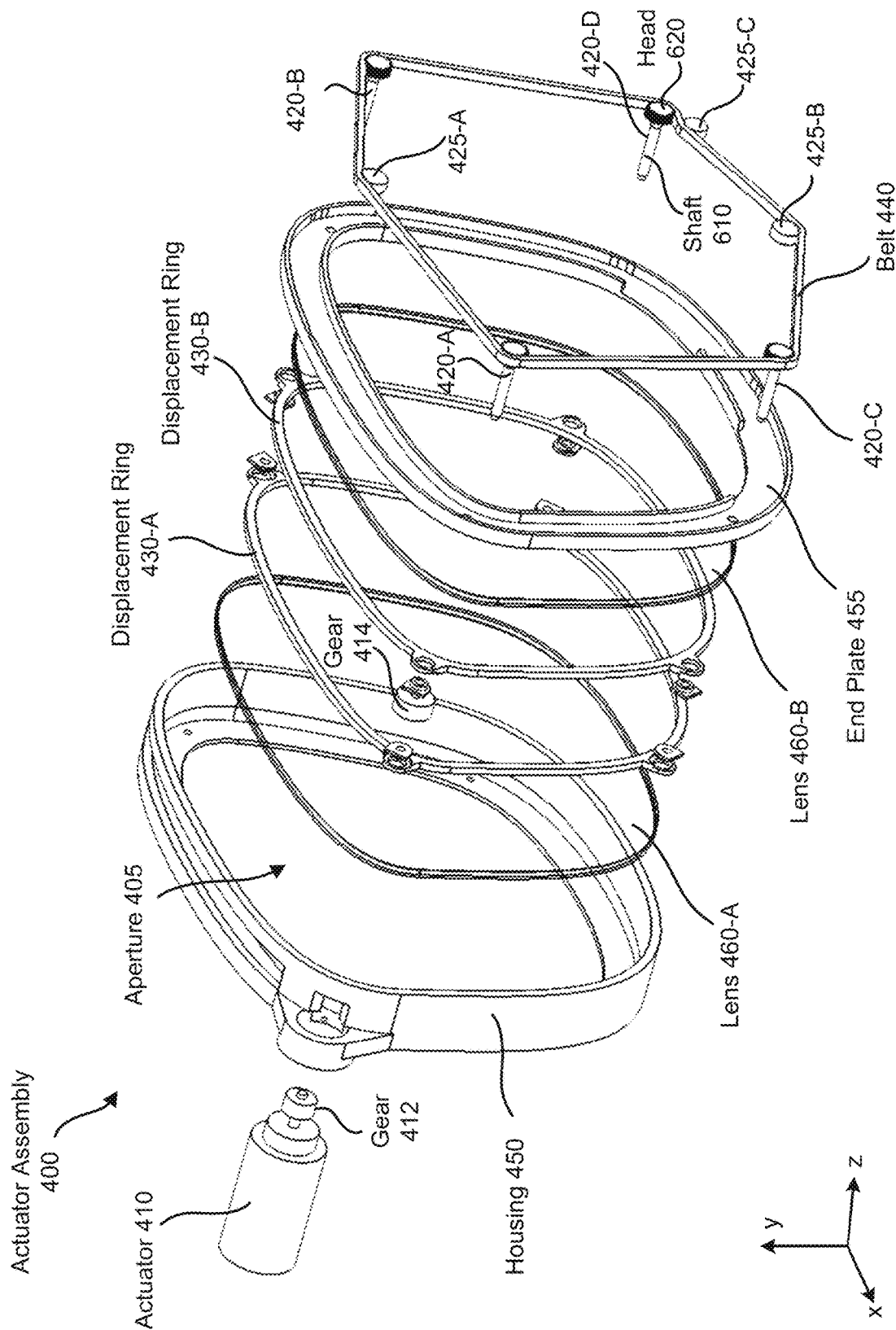
FIG. 6 is an exploded view of the actuator assembly of FIG. 4.

FIG. 6 is an exploded view of the actuator assembly 400. FIG. 6 shows in more detail the structure of the lead screws 420, each of which comprises a shaft section and a head section. For example, the lead screw 420-D includes a shaft 610 and a head 620. As mentioned earlier, the shaft may be threaded while the head is toothed. The head 620 operates as a sheave that rotates against the belt 440. Teeth of the head grip the belt 440 so that the belt 440 moves in response to rotation of the lead screw 420-A to drive the other lead screws 420-B, 420-C, and 420-D. Other head shapes are also possible, such as a toothless groove with bumps, ridges, or some other surface texture to facilitate gripping of the belt 440.

FIG. 7 is a perspective view of a floating drive nut mechanism 700 that can be used to implement an actuator assembly (e.g., the actuator assembly 400). The housing, end plate, lenses, and various other components have been omitted for clarity. The floating drive nut mechanism allows for some structural distortion of the housing as a result of natural forces arising during operation of the actuator assembly, without applying significant side loads to the lead screws 420. Otherwise, the use of rigid, close tolerance components in the presence of side loads could cause binding of the lead screws 420 or binding of the belt 440.

The floating drive nut mechanism 700 includes a set of drive nuts 710-A and 710-B with respective anti-rotation flats 720-A and 720-B. The drive nuts 710-A and 710-B can be threaded onto a lead screw 420. Only one lead screw 420 is shown, but corresponding drive nut mechanisms can be used for each of the lead screws. The drive nut 710-A contacts the displacement ring 430-A and the drive nut 710-B contacts the displacement ring 430-B. The anti-rotation flats 720 contact an inner surface of the housing 450 (not shown) to prevent rotation of the drive nuts 710 as the lead screw 420 is rotated.

The inset image shows the structure of the drive nut 710-B in more detail. The drive nut 710-A can be similarly shaped. As shown in the inset, the drive nut 710-B includes a flanged section 712 and a cylindrical section 714. The flanged section 712 contacts a back side of the displacement ring 430-B while the cylindrical section 714 is inserted through an opening of the displacement ring 430-B. The lead screw 420 passes through the cylindrical section 714, which can be inner-threaded to match the threads of the lead screw. The flanged section 712 of the drive nut 710-A is separated from the displacement ring 430-A by a gap 730. The flanged section 712 of the drive nut 710-B is likewise separated from the displacement ring 430-B. Further, the cylindrical section 714 of drive nut 710-B is separated from the displacement ring 430-B by a gap 732. The cylindrical section 714 of drive nut 710-A is likewise separated from the displacement ring 430-A. The gaps 730 and 732 provide diametrical clearance between the drive nuts and the displacement rings, allowing for a limited degree of angular movement (e.g., rotation) of the displacement rings before side loading occurs.

Figure 8:
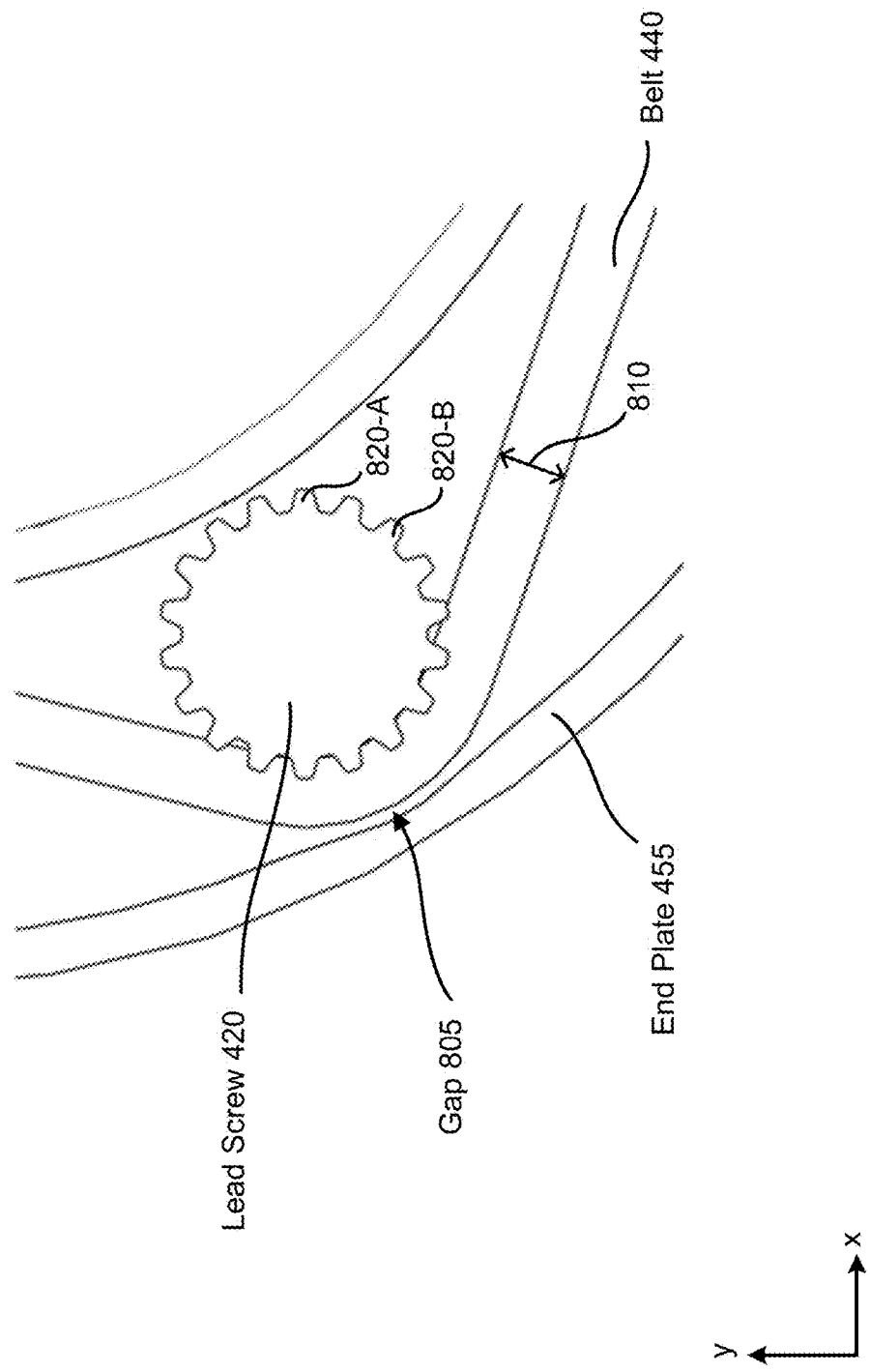
FIG. 8 is a front view of a belt slip prevention mechanism that can be used to implement an actuator assembly, according to an embodiment.

FIG. 8 is a front view of a belt slip prevention mechanism 800 that can be used to implement an actuator assembly (e.g., the actuator assembly 400). Belt slippage is a concern in the presence of external loads and housing distortion, and could result in loss of synchronization between the lead screws. The mechanism 800 comprises a small gap 805 between the end plate 455 and the belt 440 at a location of a lead screw 420. A similar gap 805 may be provided at the locations of each lead screw 420 in the actuator assembly. The gap 805 is sized to be smaller than a thickness 810 of the belt 440, preventing the belt 440 from slipping off the lead screw 420 by limiting radial displacement of the belt with respect to the lead screw. In particular, the gap 805 may prevent the belt 440 from radially displacing enough to separate from contact with the teeth 820 of the head of the lead screw 420.

Figure 9:
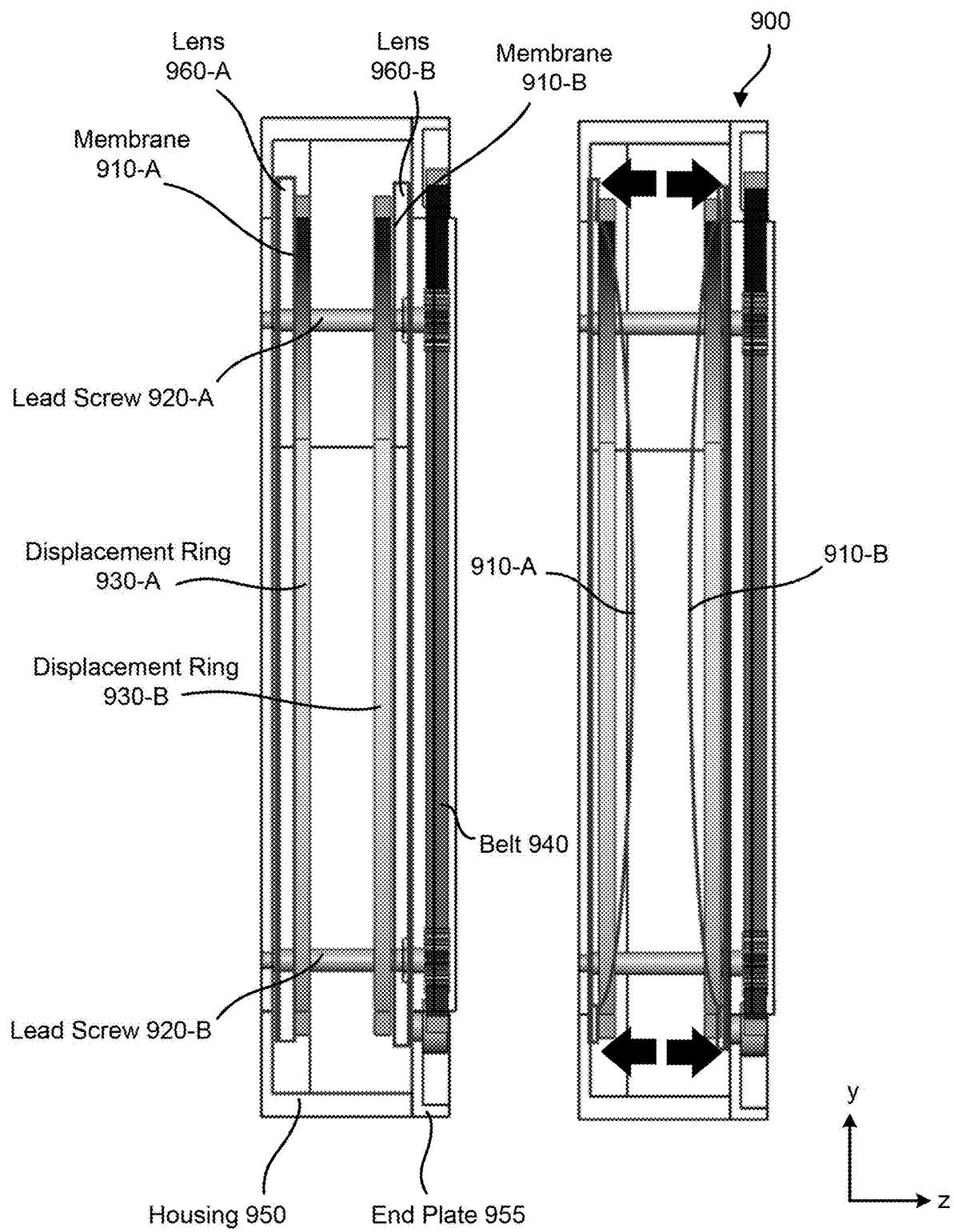
FIG. 9 shows cross-sectional views of an actuator assembly in different states of actuation, according to an embodiment.

FIG. 9 shows cross-sectional views of an actuator assembly 900 in different states of actuation. FIG. 9 illustrates the adjustment of a liquid lens using the actuator assembly 900, which includes components similar to those described above with respect to the actuator assembly 400. For example, as shown, the actuator assembly 900 includes a pair of displacement rings 930-A and 930-B, a pair of lenses 960-A and 960-B, a plurality of lead screws 920-A and 920-B, and a belt 940. However, unlike in the actuator assembly 400, the displacement rings 930 do not operate as lens holders, but are instead used to apply a force around a perimeter of the lenses 960, which are held stationary against a housing 950 and an end plate 955 of the actuator assembly 900. The force need not be applied directly along a boundary of the lenses (e.g., because the displacement rings may not be exactly aligned with the edges of the lenses). Therefore, applying a force around a perimeter of a lens or other optical element can include applying force near the edge of the optical element. Each of the lenses 960 includes a flexible membrane 910 that is displaced by the force applied around the perimeter of the lens. Opposite the membrane is a lens surface that contacts the housing 950 or the end plate 955 and which may be rigid or semi-rigid. Alternatively, the lenses 960 can be mounted on stationary holders. Torque distribution can be performed in the same manner as described with respect to the actuator assembly 400, e.g., using the belt 940 as a mechanical linkage that intercouples the lead screws 920, with the lead screw 920-A being driven by the rotational output of an actuator (not shown).

The left side of FIG. 9 shows the displacement rings 930 in a first configuration, with displacement ring 930-A resting against a membrane 910-A of the lens 960-A and displacement ring 930-B resting against a membrane 910-B of the lens 960-B. In this configuration, the lenses 960 are in a relaxed state, with the internal liquid being uniformly distributed across the lens area. The uniform distribution of the liquid produces a relatively flat membrane shape, and therefore low optical power. The membranes 910 may be configured to be in a state of tension in the relaxed state, thereby providing a natural inward spring pressure against the displacement rings 930.

When the lead screws 920 are rotated, the displacement rings 930 move away from each other in the directions shown by the arrows in the right side of the figure (e.g., if the lead screws 920 are twin lead screws with opposite direction threading for the shaft sections that couple to the displacement rings 930). The movement of the displacement rings 930 applies pressure to the lens membranes 910, causing liquid to be pushed from a periphery of the lenses 960 toward the centers of the lenses, so that the membranes 910 bulge toward the interior of the actuator assembly 900 to form a more spherical shape that increases the refraction of light through the lenses. Thus, the configuration shown on the right side of FIG. 9 has a higher optical power than the first configuration on the left side.

In some embodiments, one or more displacement rings 930 are attached to a corresponding membrane, e.g., using an adhesive, so that when the displacement ring is moved away from the lens, the membrane becomes stretched, e.g., to form a concave optical surface that provides negative optical power. Additionally, in some embodiments, the displacement rings 930 may flex in response to rotation of the lead screws 920. Further, each displacement ring 930 may have a varying cross-sectional thickness, with some sections being thicker and some sections being thinner, in order to facilitate non-uniform deflection of the displacement ring. For example, smaller cross-sections can be used in areas where less deflection is desired, and larger cross-sections can be used in areas where more deflection is desired.

Example embodiments of actuator assemblies have been described which use an electrically controlled actuator to produce rotational output that causes a plurality of intercoupled lead screws to rotate. In particular, the actuator drives a first lead screw to cause the remaining lead screws to rotate via a mechanical linkage. In some embodiments, an actuator may be omitted so that rotation of a lead screw is performed manually. Some embodiments may feature an actuator that drives a non-lead screw element (e.g., an elongated element with a non-threaded shaft and a toothed head) that is coupled to the lead screws via the mechanical linkage to provide a rotational motion that causes rotation of the lead screws. Other modifications of the disclosed embodiments are also possible.

Figure 10:
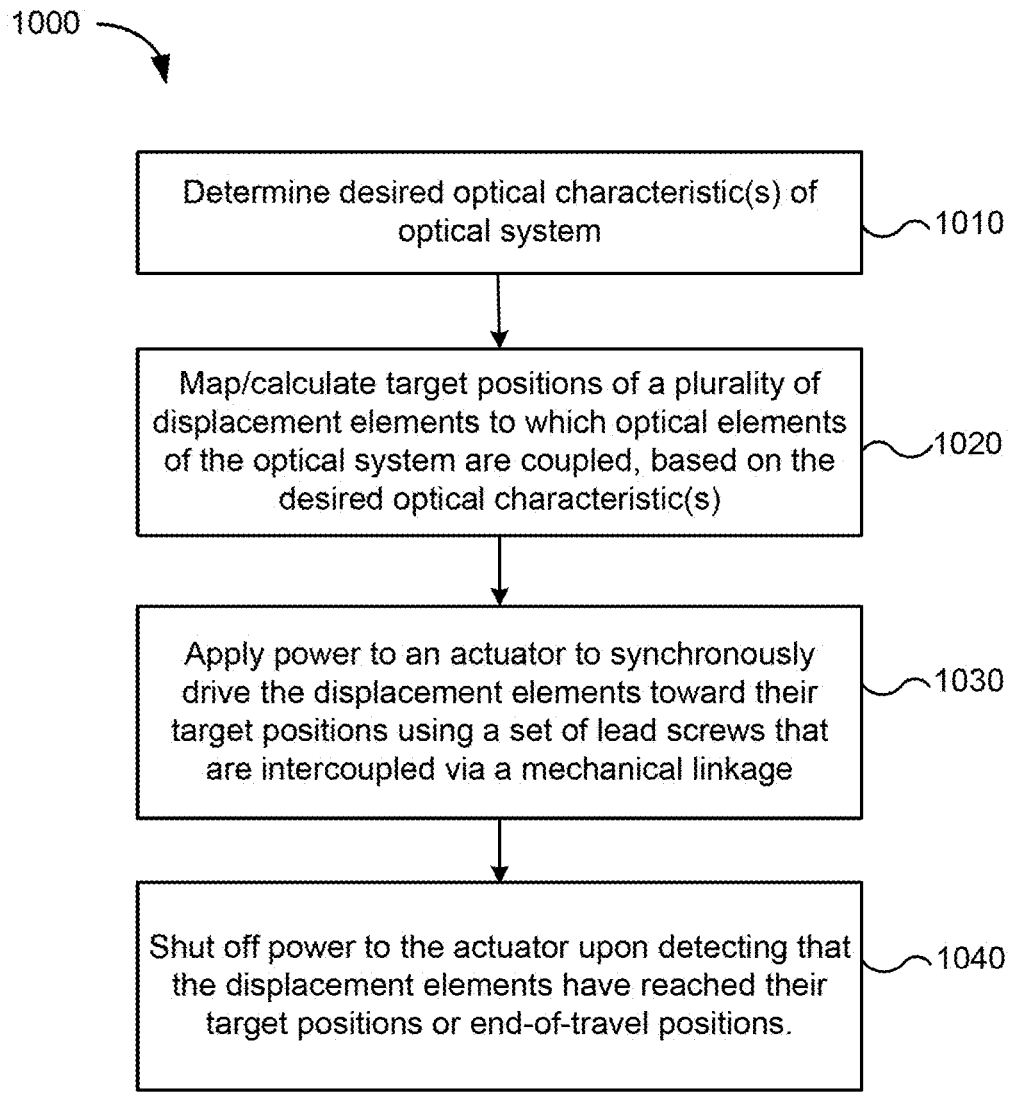
FIG. 10 is a flowchart of a method for adjusting an optical system using an actuator assembly, according to an embodiment.

FIG. 10 is a flowchart of a method 1000 for adjusting an optical system using an embodiment of an actuator assembly. The method 1000 can be applied to adjust an optical system in an HMD, for example, to move or distort (e.g., shape in a defined manner) lenses in the HMD in order to provide presbyopia correction or visual accommodation correction. The method 1000 can also be applied to other types of optical systems including, for example, optical systems that include optical elements for producing an image captured by an image sensor and optical systems that include optical elements for generating focused light output (e.g., for asymmetric laser beam shaping). The method 1000 can be performed by a controller that is implemented in hardware, software, or a combination thereof. For example, the controller may be a control unit of an HMD, or one or more processors executing computer-readable instructions on a computer system.

At step 1010, the controller determines one or more desired optical characteristics of the optical system. The optical characteristics may pertain to any number of parameters that define the performance of the optical system, e.g., optical power, focal length, zoom factor, radius of curvature, etc. The desired optical characteristics can be user selected or determined by the controller, e.g., based on a measurement of the refractive error of an eye of an HMD user.

At step 1020, the controller maps or calculates target positions of a plurality of displacement elements to which optical elements of the optical system are coupled, based on the desired optical characteristics. The displacement elements can be holders on which the optical elements are mounted (e.g., displacement rings that act as lens holders) or elements that apply force to the optical elements (e.g., the displacement rings of FIG. 9). The controller may perform mapping by referencing a stored lookup table or other data structure containing information indicating which target positions achieve the desired optical characteristics. Alternatively, the controller may calculate the target positions using the desired optical characteristics as input.

At step 1030, the controller applies power (e.g., a drive current or voltage) to an actuator of the actuator assembly, causing the actuator assembly to synchronously drive the displacement elements toward their respective target positions using a set of lead screws that are intercoupled via a mechanical linkage. The mechanical linkage can, for example, include a belt or a cable. In some instances, a single displacement element may have multiple target positions. For example, it may sometimes be desirable to use a displacement ring to apply different amounts of force along a perimeter of a lens. This could be achieved by varying the displacement at different areas of the displacement ring (e.g., each lead screw to which the displacement ring is coupled could drive the displacement ring for a different distance). As explained earlier, the actuator assembly can accommodate such asymmetric displacement through appropriate design of the lead screws (e.g., using varying thread pitch, thread direction, and/or thread length). Thus, it may even be possible for one lead screw to drive a displacement element in one direction and another lead screw to drive the same displacement element in the opposite direction.

In step 1040, the controller shuts off power to the actuator upon detecting that the displacement elements have reached their target positions. For example, the controller may receive a signal from a sensor (e.g., a shaft encoder) that enables the controller to determine the positions of the displacement elements. Further, as explained earlier, the actuator assembly may include end-of-travel micro-switches or some other mechanism that limits the travel of the displacement elements (e.g., to prevent the displacement elements from being driven beyond a specific range of positions). Thus, the controller can also shut off power upon detecting that an end-of-travel position has been reached for one or more displacement elements (e.g., to shut off power as soon as an end-of-travel position is detected for any displacement element).

Figure 11:
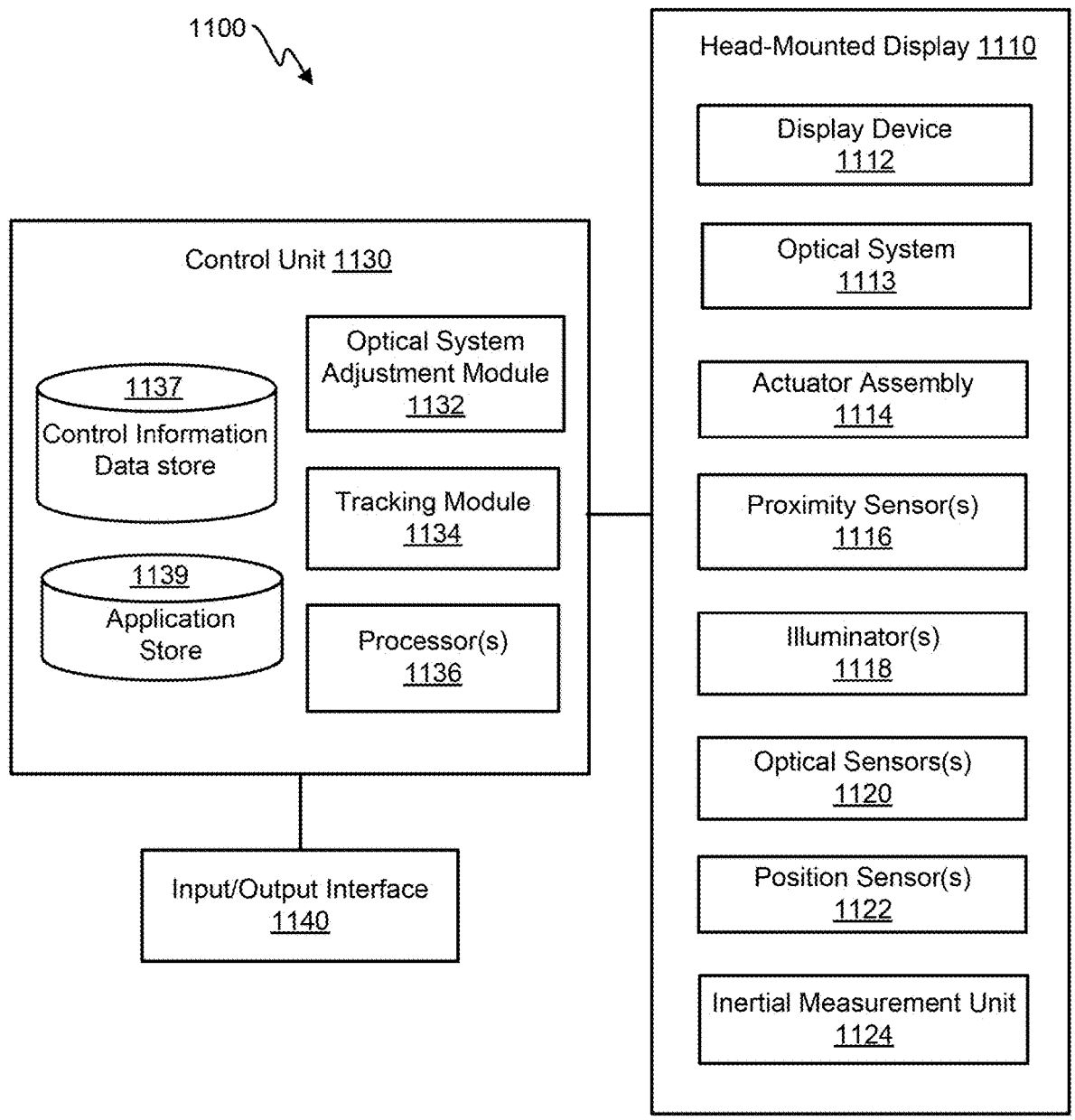
FIG. 11 is a block diagram of a system in which one or more embodiments may be implemented.

FIG. 11 is a block diagram of a system 1100 in which one or more embodiments may be implemented. The system 1100 includes an HMD 1110, a control unit 1130, and an input/output (I/O) interface 1140. The HMD 1110 includes a display device 1112, an optical system 1113, an actuator assembly 1114, at least one proximity sensor 1116, at least one illuminator 1118, at least one optical sensor 1120, at least one position sensor 1122, and an inertial measurement unit 1124.

The display device 1112 includes a display screen for presenting visual media, such as images and/or video, to a user. In addition to visual media, the HMD 1110 may include an audio output device (not shown) for presenting audio media to the user, e.g., in conjunction with the presentation of the visual media.

The optical system 1113 includes at least one optical element (e.g., a lens, a waveguide, a reflector, etc.) that affects image light. Multiple optical elements may be stacked together to, for example, direct and guide light from the display device 1112 toward an eye of the user.

The actuator assembly 1114 includes an actuator operable to produce rotational output (e.g., a motor), a plurality of lead screws, and a mechanical linkage (e.g., a belt or cable) configured to simultaneously rotate the plurality of lead screws. The actuator assembly 1114 further includes a plurality of displacement elements (e.g., displacement rings). Each displacement element is configured to act upon a respective optical element to which the displacement element is coupled, through translational motion of the displacement element in response to rotation of the plurality of lead screws.

The actuator assembly 1114 may include a housing for the optical elements of the optical system 1113. The housing of the actuator assembly can be integrated into a housing of the HMD 1110. For example, the HMD 1110 may include a housing similar to the housing 220 in FIG. 2. The actuator assembly 1114 and the optical system 1113 may be positioned along an optical path between the eye of the user and the display device 1112, with the optical path passing through the optical elements of optical system 1113. A separate actuator assembly and optical system may be provided for each eye of the user.

The proximity sensor 1116 can be a sensor configured to detect that the user is wearing the HMD 1110. For example, the proximity sensor 1116 can be a simple mechanical switch that is activated when the user's head is pressed against a frame of the HMD 1110. Alternatively, the proximity sensor 1016 can be a resistive or capacitive touch sensor configured to detect contact with the user's head based on electrical measurements. In some embodiments, the proximity sensor 1116 is an optical sensor.

The illuminator 1118 is an electrically triggered light source that generates light for use in connection with presentation of image content on the display device. For example, the generated light could be used in combination with one or more optical sensors 1120 to perform eye tracking or tracking of head movements in order to update image content from one or more applications executed by the control unit 1130. In some embodiments, the generated light may be used to perform a measurement that determines a degree to which a vision of the user needs to be corrected, e.g., a degree of presbyopia or visual accommodation error. The illuminator 1118 can be placed in a frame of the HMD 1110 or integrated into an optical component such as the display device 1112.

The optical sensor 1120 can be an image sensor configured to capture 2D and/or 3D image data, for example, a 2D image of the user's eye or the external environment around the user.

The position sensor 1122 can be a gyroscope, an accelerometer, a global positioning system device, or any other device that detects changes in the location and/or orientation of the HMD 1110.

The inertial measurement unit 1124 is an electronic device that generates data indicating an estimated position of the HMD 1110, e.g., based on measurement signals received from the position sensor 1122. The measurement signals can include, for example, signals indicative of roll, pitch, yaw, or acceleration.

The I/O interface 1140 is a device that allows the user to send action requests to the control unit 1130. An action request is a request to perform a particular action. For example, an action request may be to start or end an application or to perform a particular action within the application.

The control unit 1130 is configured to direct the operation of the HMD 1110 including, for example, selecting image content for presentation on the display device 1112, activating the illuminator 1118, and adjusting the optical system 1113 (e.g., moving or shaping one or more optical elements of the optical system 1113 using an embodiment of an actuator assembly). The control unit 1130 includes an optical system adjustment module 1132, a tracking module 1134, one or more processors 1136, a control information data store 1137, and an application store 1139. The control unit 1130 can include components that are integrated into the HMD 1110. In some embodiments, one or more components of the control unit 1130 are remotely located. For example, the control information data store 1137 can be located on a remote server or distributed between a memory of the control unit 1130 and a remote server.

The control unit 1130 outputs signals that control the actuator of the actuator assembly 1114. The control signals can be sent directly to the actuator (e.g., the control unit 1130 may output voltage or current signals that drive the actuator) or sent to a power source that produces power for the actuator (e.g., a voltage or current generator).

The control information data store 1137 stores control information that the control unit 1130 uses for controlling the actuator assembly 1114. For example, the control information may include a lookup table mapping one or more optical characteristics of the optical system 1113 to target positions of displacement elements in the actuator assembly 1114.

The application store 1139 stores one or more applications for execution by the control unit 1130. An application is a set of instructions executable by a processor, for example instructions that cause the processor to generate content for presentation to the user on the display device 1112. Examples of applications include: gaming applications, conferencing applications, video playback application, or other suitable applications.

The optical system adjustment module 1132 can be implemented in hardware and/or software and is configured to adjust one or more optical characteristics of the optical system 1113 using the control information stored in the control information data store 1137. In some embodiments, the optical system adjustment module 1132 comprises instructions stored on a non-transitory computer-readable medium, the instructions being executable by the processor 1136 to control the actuator assembly 1114.

The tracking module 1134 can be implemented in hardware and/or software and is configured to track changes in the position of the HMD 1110 and/or the position of the user's facial features (e.g., eye tracking). In some embodiments, the tracking module 1134 may track the movements of the HMD 1110 and correlate the HMD movements to movement of the user's head.

The processor 1136 executes instructions from applications stored in the application store 1139 and/or instructions provided to the processor 1136 by the optical system adjustment module 1132 or the tracking module 1134. The processor 1136 can receive various items of information used in the applications. This includes, for example, position information, acceleration information, velocity information, and captured images. Information received by processor 1136 may be processed to produce instructions that determine content presented to the user on the display device 1112.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description may describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An actuator assembly, comprising:
a plurality of lead screws;
a mechanical linkage that intercouples the plurality of leads screws, the mechanical linkage configured to simultaneously rotate the plurality of lead screws;
a plurality of displacement elements including a first displacement element and a second displacement element, wherein:
each displacement element is configured to act upon a respective lens through translational motion of the displacement element in response to rotation of the plurality of lead screws,
the first displacement element and the second displacement element are configured to undergo translational motion together due to the first displacement element and the second displacement element both being coupled to the plurality of lead screws,
translational motion of the first displacement element causes the first displacement element to act upon a first lens by applying force to a flexible membrane of the first lens, and
translational motion of the second displacement element causes the second displacement element to act upon a second lens located behind the first lens by applying force to a flexible membrane of the second lens;
a first drive nut located between the first displacement element and a first lead screw of the plurality of lead screws, wherein a portion of the first drive nut is spaced apart from the first displacement element to accommodate rotation of the first displacement element before side loading of the first lead screw occurs; and
a second drive nut located between the second displacement element and the first lead screw or a second lead screw of the plurality of lead screws, wherein a portion of the second drive nut is spaced apart from the second displacement element to accommodate rotation of the second displacement element before side loading of the first lead screw or the second lead screw occurs.

2. The actuator assembly of claim 1, further comprising:
an actuator configured to produce a rotational output that drives the first lead screw of the plurality of lead screws.

3. The actuator assembly of claim 1, wherein the first displacement element is a ring configured to apply force around a perimeter of the flexible membrane of the first lens, and wherein the second displacement element is a ring configured to apply force around a perimeter of the flexible membrane of the second lens.

4. The actuator assembly of claim 1, wherein the plurality of lead screws have different threading.

5. The actuator assembly of claim 1, wherein the mechanical linkage comprises a belt or cable, and wherein the belt or cable wraps around each of the plurality of lead screws.

6. The actuator assembly of claim 1, wherein for each lead screw in the plurality of lead screws, the first displacement element and the second displacement element are coupled to different sections along a shaft of the lead screw.

7. The actuator assembly of claim 6, wherein simultaneous rotation of the plurality of leads screws causes the first displacement element and the second displacement element to move closer together or farther apart, along the shaft of each lead screw.

8. The actuator assembly of claim 1, wherein:
the flexible membrane of the first lens and the flexible membrane of the second lens form separate sealed cavities that each contains liquid,
the first displacement element is located outside the sealed cavity of the first lens, and
the second displacement element is located outside the sealed cavity of the second lens.

9. The actuator assembly of claim 1, wherein the first drive nut comprises a cylindrical section that is inner-threaded to match a threading of the first lead screw, the cylindrical section being inserted through an opening of the first displacement element.

10. The actuator assembly of claim 9, wherein:
the cylindrical section is separated from the first displacement element by a first gap that accommodates rotation of the first displacement element before side loading of the first lead screw occurs,
the first drive nut further comprises a flanged section that contacts a back side of the first displacement element, and
part of the flanged section is separated from the first displacement element by a second gap that accommodates rotation of the first displacement element before side loading of the first lead screw occurs.

11. The actuator assembly of claim 9, wherein the first drive nut further comprises a flanged section that contacts a back side of the first displacement element, the flanged section including a flat portion that contacts an inner surface of a housing containing the actuator assembly such that rotation of the first drive nut in response to rotation of the first lead screw is prevented.

12. The actuator assembly of claim 1, wherein the second drive nut is located between the second displacement element and the first lead screw.

13. A system, comprising:
a head-mounted device including a first lens and a second lens located behind the first lens; and
an actuator assembly housed within the head-mounted device, the actuator assembly including:
a plurality of lead screws;
a mechanical linkage that intercouples the plurality of leads screws, the mechanical linkage configured to simultaneously rotate the plurality of lead screws;
a plurality of displacement elements including a first displacement element and a second displacement element, wherein:
each displacement element is configured to act upon a respective lens through translational motion of the displacement element in response to rotation of the plurality of lead screws,
the first displacement element and the second displacement element are configured to undergo translational motion together due to the first displacement element and the second displacement element both being coupled to the plurality of lead screws,
translational motion of the first displacement element causes the first displacement element to act upon the first lens by applying force to a flexible membrane of the first lens, and translational motion of the second displacement element causes the second displacement element to act upon the second lens by applying force to a flexible membrane of the second lens;

a first drive nut located between the first displacement element and a first lead screw of the plurality of lead screws, wherein a portion of the first drive nut is spaced apart from the first displacement element to accommodate rotation of the first displacement element before side loading of the first lead screw occurs; and a second drive nut located between the second displacement element and the first lead screw or a second lead screw of the plurality of lead screws, wherein a portion of the second drive nut is spaced apart from the second displacement element to accommodate rotation of the second displacement element before side loading of the first lead screw or the second lead screw occurs.

14. The system of claim 13, wherein the first lens and the second lens are configured to direct light from an optical aperture to an eye of a user wearing the head-mounted device.

15. The system of claim 14, wherein the plurality of lead screws are located along a periphery of the optical aperture.

16. The system of claim 14, wherein at least one of the first lens or the second lens is asymmetrically shaped.

17. The system of claim 14, wherein the first displacement element is a ring configured to apply force upon the flexible membrane of the first lens, and wherein the second displacement element is a ring configured to apply force upon the flexible membrane of the second lens.

18. The system of claim 13, wherein the plurality of lead screws have different threading.

19. The system of claim 13, wherein for each lead screw in the plurality of lead screws, the first displacement element and the second displacement element are coupled to different sections along a shaft of the lead screw.

20. The system of claim 19 wherein simultaneous rotation of the plurality of leads screws causes the first displacement element and the second displacement element to move closer together or farther apart, along the shaft of each lead screw.

* * * * *